United States Patent
Svensson et al.

(10) Patent No.: US 10,876,464 B2
(45) Date of Patent: Dec. 29, 2020

(54) PISTON DESIGN FOR FLOW RE-DIRECTION

(71) Applicant: Caterpillar Inc., Deerfield, IL (US)

(72) Inventors: Kenth I. Svensson, Peoria, IL (US); Jonathan W. Anders, Peoria, IL (US); Adam Dempsey, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 81 days.

(21) Appl. No.: 16/140,871

(22) Filed: Sep. 25, 2018

(65) Prior Publication Data
US 2020/0095920 A1    Mar. 26, 2020

(51) Int. Cl.
*F02B 23/06* (2006.01)
*F02F 3/26* (2006.01)
(52) U.S. Cl.
CPC ...... *F02B 23/0651* (2013.01); *F02B 23/0618* (2013.01); *F02B 23/0624* (2013.01); *F02B 23/0666* (2013.01); *F02B 23/0678* (2013.01); *F02B 23/0693* (2013.01); *F02F 3/26* (2013.01)
(58) Field of Classification Search
CPC ............. F02B 23/0627; F02B 23/0672; F02B 23/0678; F02B 23/0681; F02B 23/0684; F02B 23/0693; F02B 23/0696
See application file for complete search history.

(56) References Cited

U.S. PATENT DOCUMENTS

| | | | |
|---|---|---|---|
| 7,942,126 B2 * | 5/2011 | Zoller | F02B 23/0693 123/298 |
| 8,156,927 B2 | 4/2012 | Iikubo et al. | |
| 8,646,428 B2 | 2/2014 | Eismark et al. | |
| 9,476,381 B2 * | 10/2016 | Bowing | F02B 23/08 |
| 10,060,386 B2 * | 8/2018 | Eismark | F02B 23/0627 |
| 10,731,544 B2 * | 8/2020 | Svensson | F02D 41/405 |
| 10,738,682 B2 * | 8/2020 | Eismark | F02B 23/0669 |
| 2015/0107543 A1 * | 4/2015 | Bowing | F02B 23/0621 123/193.6 |
| 2015/0128899 A1 * | 5/2015 | Easley | F02D 21/08 123/294 |
| 2015/0308371 A1 * | 10/2015 | Eismark | F02F 3/0015 123/193.6 |
| 2019/0003372 A1 * | 1/2019 | Eismark | F02B 23/0696 |
| 2020/0095921 A1 * | 3/2020 | Svensson | F02B 23/0696 |
| 2020/0095922 A1 * | 3/2020 | Vassallo | F02B 23/0651 |

FOREIGN PATENT DOCUMENTS

DE    102009018485 A1    10/2010
DE    102014002625 A1    8/2015

* cited by examiner

*Primary Examiner* — Kevin R Steckbauer
(74) *Attorney, Agent, or Firm* — Hibshman Claim Construction PLLC

(57) ABSTRACT

A piston for an internal combustion engine includes a crown portion having a bowl that includes a plurality of protrusions. Each of the plurality of protrusions includes a first side surface and a second side surface. Other features including at least one ledge formed between protrusions in segments, and a generally flat, inward facing surface on the protrusions may also be used.

16 Claims, 3 Drawing Sheets

PISTON DESIGN FOR FLOW RE-DIRECTION

TECHNICAL FIELD

This patent disclosure relates generally to internal combustion engines and, more particularly, to combustion chamber features for direct-injection engines.

BACKGROUND

Most modern engines are direct-injection engines, which means that each combustion cylinder of the engine includes a dedicated fuel injector configured to inject fuel directly into a combustion chamber. While direct-injection engines represent an improvement in engine technology over past designs, in the form of increased engine efficiency and reduced emissions, the improvement of the design of any particular engine is always desirable, especially in light of increasing fuel costs and ever more strict regulations on engine emissions.

In a traditional direct-injection engine, one or more fuel jets that are injected into a combustion chamber interact with various combustion chamber structures, which cause the fuel to disperse into the combustion chamber. More specifically, the fuel jet(s) entering the combustion chamber impact various surfaces of the combustion chamber such as a piston bowl, the flame deck surface of the cylinder head, the cylinder liner or bore, and other surfaces before spreading in all directions. The impingement of the fuel jets with these structures may have a variety of effects including increased emissions because localized areas having higher fuel concentrations may burn rich, while other areas in the combustion chamber may burn lean. Following interaction with the various internal surfaces of the combustion chamber, the fuel jets and resulting flames may also interact with neighboring fuel jets or flames. These interactions can further result in higher temperatures, decreased fuel efficiency, increased heat rejection and component temperatures, and the like.

Various solutions have been proposed in the past for improving an engine's efficiency and reducing its emissions. One example of a previously proposed solution can be seen in U.S. Pat. No. 8,646,428 ("Eismark"), which was granted on Feb. 11, 2014. Eismark describes a piston having a crown in which protrusions having a smooth form are adapted for preserving kinetic energy in a flame plume. The piston is designed to be used in an engine in which quiescent air is provided in the engine cylinder. The fuel injector provides fuel jets or flames into the cylinder that impinge on features formed in the piston bowl to redirect portions of the flames upward, towards a cylinder head surface, and the remaining portions of the flames in a tangential direction, within the bowl, to achieve better mixing of the combustion gases and decrease or eliminate stagnation zones in a combustion chamber.

While the flow redirection of Eismark may be partially effective in improving burning of fuel in an engine cylinder, it is configured to operate with a quiescent cylinder, which is difficult to attain for each cylinder consistently. In a typical engine, the momentum of intake air into an engine cylinder will possess at least some swirl, which following fuel injection into the cylinder will cause the flames that develop to be carried by the swirling air to one side and generally towards the cylinder wall.

SUMMARY

The disclosure describes, in one aspect, an internal combustion engine. The internal combustion engine includes an engine block having a cylinder bore, a cylinder head having a flame deck surface disposed at one end of the cylinder bore, and an air intake valve associated with the cylinder head and configured to open and allow a flow of intake charge into the cylinder bore. A piston is connected to a rotatable crankshaft and configured to reciprocate within the cylinder bore. The piston has a crown portion facing the flame deck surface such that a combustion chamber is defined within the cylinder bore and between a top surface of the crown portion and the flame deck surface. The crown portion includes a piston bowl having a generally concave shape and extending within the crown portion and a wall, the wall extending peripherally around the piston. A fuel injector has a nozzle tip disposed in fluid communication with the combustion chamber. The nozzle tip has a plurality of nozzle openings configured to inject a plurality of fuel jets into the combustion chamber, each of the plurality of fuel jets being provided along a respective fuel jet centerline.

In one embodiment, a plurality of protrusions is disposed in the piston bowl adjacent the wall. Each of the plurality of protrusions includes a first side surface and a second side surface. At least one ledge extends at least partially through an inner face and towards an outer face of the wall. The at least one ledge extends at a depth that is less than a depth of the piston bowl.

In another aspect, the disclosure describes a piston for an internal combustion engine. The piston includes a piston body, a crown portion extending below a top surface of the piston body, the crown portion including a bowl having a generally concave shape and extending within the crown portion and a wall, the wall extending peripherally around the piston body, a plurality of protrusions disposed in the piston bowl adjacent the wall, each of the plurality of protrusions including a first side surface and a second side surface, and at least one ledge extending at least partially through an inner face and towards an outer face of the wall, the at least one ledge extending at a depth that is less than a depth of the piston bowl.

DETAILED DESCRIPTION

Figure 1:
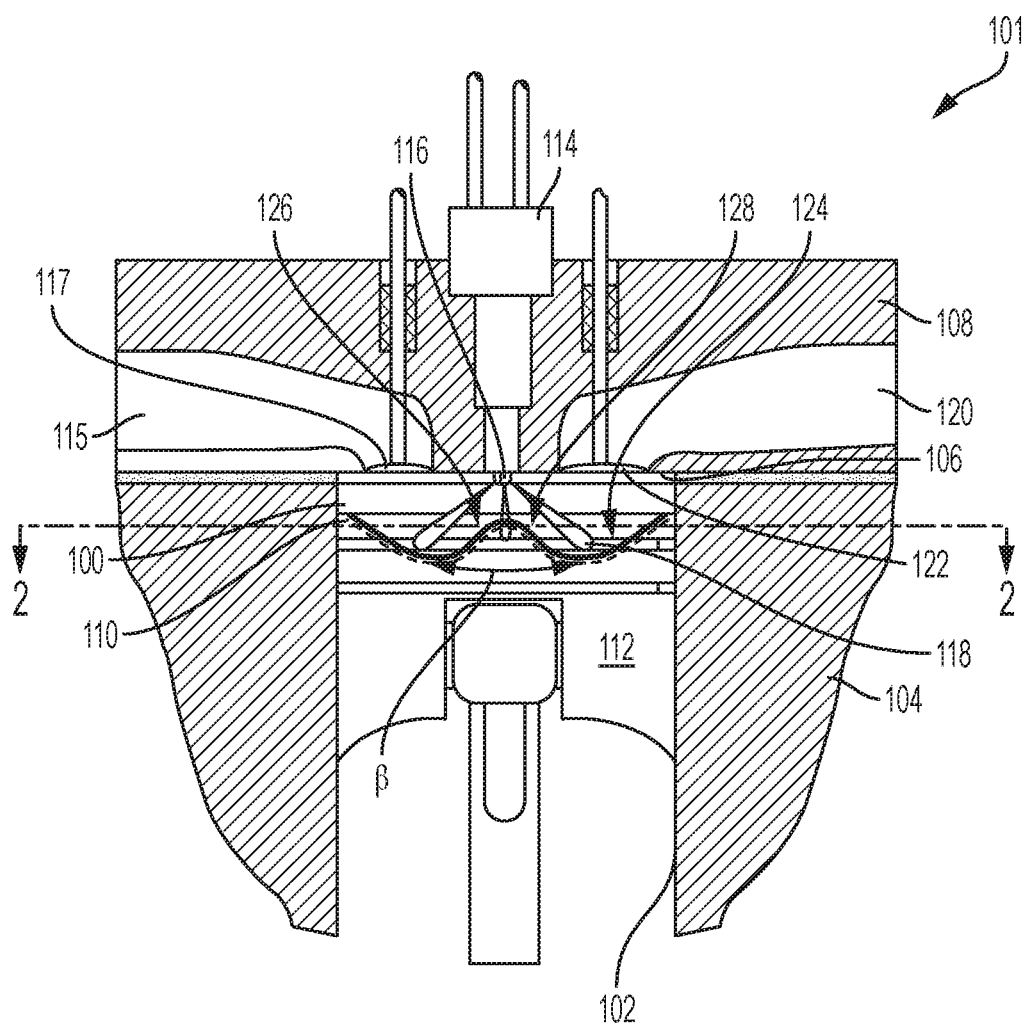
FIG. 1 is a cross section of an engine combustion chamber in accordance with the disclosure.

This disclosure relates to internal combustion engines and, more particularly, to features incorporated within at least one combustion chamber of the engine to redirect fuel jets provided by separate fuel injector nozzle openings towards a center portion of the combustion chamber, for example, towards a fuel injector, even for cylinders in which incoming air or an intake charge, which intake charge may include a mixture of air, fuel and/or recirculated exhaust gas, may include swirl. In the present disclosure, the term "jets" or "fuel jets" describes reacting (i.e. burning) or non-reacting streams of fuel, alone or in mixture with air, that is provided into an engine cylinder. These fuel jets may therefore comprise fuel droplets dispersed in air, or a flame once the fuel begins to oxidize with the surrounding air. In accordance with the disclosure, the fuel jets are redirected and also segregated during a majority of the injection time and/or burn time to promote better oxygen utilization within the combustion chamber as compared to previously proposed or known combustion systems.

The various exemplary embodiments described herein include structures and features that operate or result in redirecting fuel jets radially with respect to the cylinder bore of an engine, to thus minimize or, at least, delay interaction between adjacent fuel jets entering the combustion chamber. The type of fuel being provided to the cylinder may be a spray of liquid fuel such as diesel or gasoline, or a jet of gaseous fuel such as natural or petroleum gas. The design is configured to impart an asymmetric effect to a combined air and fuel moving mass of fluids, which initially have a swirling aggregate velocity vector and which are redirected to have an aggregate radial velocity vector towards a center of the piston bore.

Stated differently, air or an intake charge, which may include air in mixture with recirculated exhaust gas and/or fuel, entering into the cylinder may have swirl, i.e., radial and primarily tangential velocity components of each air particle. As fuel is injected into the chamber, it mixes with the air. The fuel particles or droplets have generally a radial velocity component such that, when the fuel droplets mix and evaporate into the swirling air, the tangential velocity component of the resulting mixtures is reduced, but not eliminated. The remaining tangential velocity component is countered by uneven or asymmetrical surfaces presented on protrusions on the piston, which impart a counter-swirl tangential velocity component to the fuel/air mixture that impinges on and is affected by the protrusion surfaces. The counter-swirl tangential velocity component of the fuel/air mixture thus cancels or eliminates the original tangential velocity of the swirling air mass, such that the resulting fuel/air mixture possesses a radially inward velocity component. In this way, a burning air/fuel mixture is directed inwardly relative to the piston, where additional oxygen to support the burning fuel is available. The disclosed embodiments can be tailored to counter many different particular swirling patterns that may exist in engine cylinders, and essentially transform a swirling combustion system into a quiescent combustion system. Some of the benefits of such a combustion system include reduced heat rejection, in that the flame is guided towards the center of the cylinder and away from the metal structures of the engine that surround and define the cylinder, which in turn leads to lower component temperatures, increased fuel efficiency, and a more uniform fuel/air mixture, which also leads to lower engine emissions.

A cross section of a combustion chamber 100 of an engine 101 in accordance with the disclosure is shown in FIG. 1. The combustion chamber 100 has a generally cylindrical shape that is defined within a cylinder bore 102 formed within a crankcase or engine block 104 of the engine. The combustion chamber 100 is further defined at one end by a flame deck surface 106 of a cylinder head 108, and at another end by a piston crown 110 of a piston 112 that is reciprocally disposed within the cylinder bore 102. A fuel injector 114 is mounted in the cylinder head 108. The fuel injector 114 has a tip 116 that protrudes within the combustion chamber 100 through the flame deck surface 106 such that it can directly inject fuel into the combustion chamber 100.

During operation of the engine 101, air or an intake charge is admitted into the combustion chamber 100 via an air inlet passage 115 when one or more intake valves 117 (one shown) are open during an engine stroke, for example, at least a portion of an intake stroke, compression stroke and/or exhaust stroke. As is the case in most engines, an incoming airflow into the combustion chamber 100 through the one or more intake valves 117 will be highly turbulent and possess swirling portions around one or more axes, which are imparted into the air flow by the various bends and corners in the air inlet passage 115 and other structures such as air passing over and around the intake valve 117. In a known configuration, high pressure fuel is permitted to flow through a plurality of nozzle openings in the tip 116. Each nozzle opening creates a fuel jet 118 that generally disperses to create a fuel/air mixture, which in a compression ignition engine auto-ignites and combusts. The fuel jets 118 may be provided from the injector at an included angle, $\beta$, of between 110 and 150 degrees, but other angles may also be used. The fuel jets 118 enter the combustion chamber 100 in a generally radially outward direction as the fuel travels through the injector openings. Following combustion, exhaust gas is expelled from the combustion chamber through an exhaust conduit 120 when one or more exhaust valves 122 (one shown) is/are open during an exhaust stroke and/or intake stroke.

The uniformity and extent of fuel/air mixing in the combustion cylinder is relevant to the combustion efficiency as well as to the amount and type of combustion byproducts that are formed and to the rate of combustion within the combustion chamber. For example, fuel-rich mixtures, which may be locally present within the combustion chamber 100 during a combustion event due to insufficient mixing, or insufficient air available locally around those areas, may lead to higher soot, hydrocarbon, and carbon monoxide emissions and lower combustion efficiency. In the illustrated embodiments, improved fuel/air combustion is managed for each fuel jet by forming a plurality of protrusions, which asymmetrically funnel or guide flames created when streams of air and fuel in the cylinder burn. This flame guiding is also helpful in achieving a more complete combustion within the cylinder, which can lower soot and other emissions of the engine. The direction of flame propagation after the flames have been redirected by interaction with features in the piston bowl is such that at least a portion of the flames is directed to counter a swirl present in the cylinder. The net effect of the directed flames and swirling air is a direction of the flames towards the center of the piston, where air is available to burn an air/fuel mixture and oxidize soot. Each protrusion has two sides, a first side that has a generally concave shape and a normal vector that faces towards or against a swirling direction, and a second side that has a generally flat and/or convex shape and a normal vector that faces with or in the same direction as the swirling direction of air in the combustion chamber 100. In this way, either side of each protrusion serves to accept, redirect and segregate a portion of each of two adjacent fuel jets originating from the plurality of nozzle openings in the fuel injector, and redirect them towards the center of the combustion chamber 100.

Figure 2:
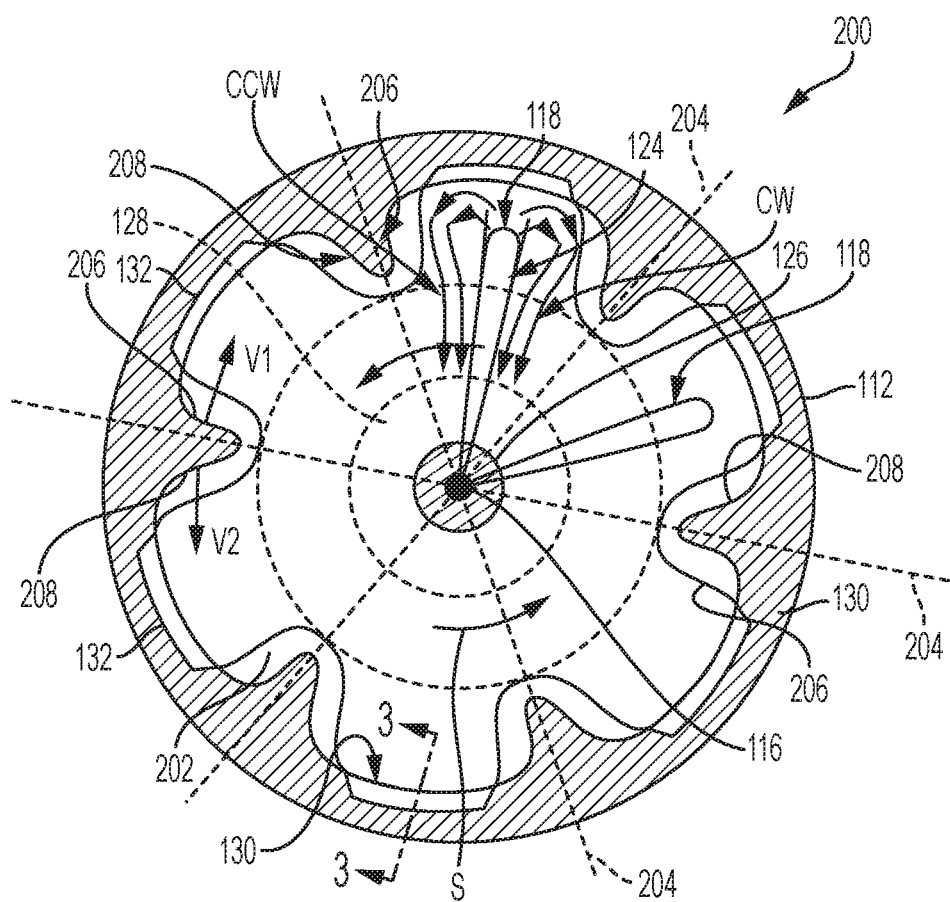
FIG. 2 is a top view in cross section of an engine piston in accordance with a first embodiment of the disclosure.

A first exemplary embodiment of the piston 112 is shown in FIG. 2. In the illustration of FIG. 2, only a top surface 200 of the piston crown 110 of the piston 112 is shown in cross section from a top perspective for illustration. The piston 112 includes a bowl 124 formed in the piston crown 110 that includes a central, raised conical protrusion 126 at the center of a conical, convex surface 128. The bowl 124 has a generally circular periphery and is defined within a circular crown wall 130. Included in the top surface 200 is a plurality of protrusions 202, which are disposed within the bowl 124 and along a periphery of the bowl 124 adjacent the wall 130. Six protrusions 202 are shown herein, but it should be appreciated that any number of protrusions can be used depending on the number of nozzle openings in the tip 116 of the injector. The protrusions in the top surface 200 are arranged at regular intervals along equally distributed radial axes 204. Each axis 204 is disposed at exactly the same angle between the spray directions of adjacent nozzle tip openings of the fuel injector 114 such that a fuel jet 118 will emanate from the tip 116 in a radial direction between two adjacent axes 204, as shown.

In the schematic embodiment shown in FIG. 2, the development of two adjacent fuel jets 118 is shown at different instances in time. The lower, not fully developed jet to the right of the figure is shown at an instant when the fuel jet 118 has been emanated from the tip 116 but has not yet reached the wall 130. During this, initial time in an injection, the air in the cylinder and, thus, in and above the bowl 124, may have a generally circular or spiral momentum in a counterclockwise direction indicated by the block arrows "S." While the fuel jet 118 is travelling through a moving region of air, the speed of the air, which may include a tangential velocity vector because of the swirling momentum may not affect the radial travel direction of the fuel jet 118, at least initially. However, at a later instant, as shown by the fuel jet 118 shown counterclockwise and to the left of the original jet, towards the top of the figure, the fuel jet or flame 118 may impinge against the wall 130 and separate into two tangential jets, each tangential jet heading towards the two adjacent protrusions 202 that flank the impingement site.

Figure 3:
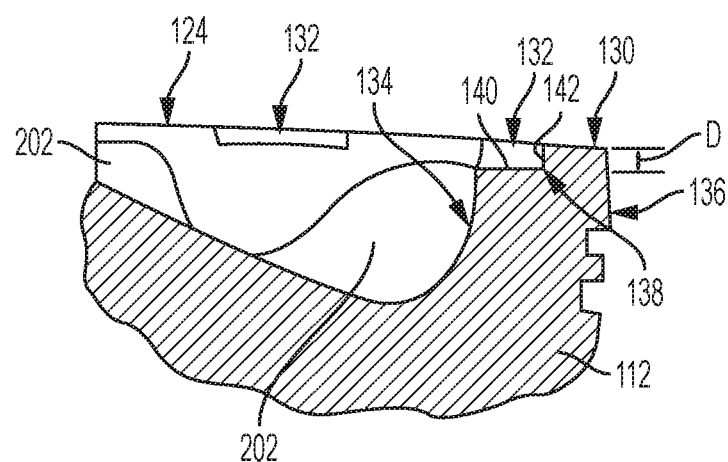
FIG. 3 is an enlarged, partial section through a sidewall of the engine piston of FIG. 2.

As can be seen in FIG. 2, a segment of the wall 130 between adjacent protrusions includes a recessed or stepped-lip feature or ledge 132 extending at least partially through an inner face 134 of the wall 130 towards an outer face 136 of the wall 130. At least a portion of the ledge 132 from a side perspective is shown in the enlarged detailed cross section of FIG. 3. The ledge 132 in the illustrated embodiment does not extend peripherally along the entire inner circumference of the wall 130, but is rather formed in segments, each segment spanning a chordal distance along the inner circumference of the wall 130 between adjacent protrusions 202. Each ledge 132 is curved to follow the contour of the wall 130 and has a peripheral width along a radial direction that is less than a thickness of the wall 130 in that direction. Each ledge further has a depth, D, in the axial direction that corresponds to a distance traveled by the piston in the bore for a given rotation of engine's crankshaft. An outer edge 138 of the ledge 132 can be embodied as a sharp corner, as shown in FIG. 3, or as a blended, chamfered surface smoothly connecting a ledge floor 140 with an outer ledge wall 142.

During engine operation, the timing for providing one or more injection events for the fuel jets 118 may be selected such that the fuel jets 118 at least partially impinge into the ledges 132 as the piston 112 is moving upward into the bore during a compression stroke and/or downward during an expansion stroke. The recesses provided by the ledges 132 may allow at least some fuel to proceed radially outwardly relative to the piston and enter the so-called "squish region," which describes an upper and radially outward hollow cylindrical volume within the piston bore that is disposed between the flame deck surface and a top, annular surface of the wall 130 and also, in this embodiment, an aggregate volume of the ledges 132. As the piston progresses upward, the same or subsequent fuel jets will no longer overlap the ledges and impinge lower on the inner surface 134 of the wall 130 to be redirected towards an inner portion of the combustion chamber. In another embodiment, delayed timing of the fuel jets 118 and the flames created thereby during an expansion stroke, i.e., when the piston is moving downward in the cylinder, the fuel jets 118 may be directed inward relative to the combustion cylinder and then, at least momentarily, overlap the ledges 132 as the piston 112 is descending and redirect at least a portion of the fuel jets 118 upward towards the flame deck surface.

Turning now to the protrusions 202, these features are configured to redirect the fuel jets 118 within the cylinder towards the center of the combustion chamber. The protrusions 202 present different profiles or shapes to asymmetrically guide the tangential jets that impinge thereon and to delay jet-to-jet interaction for improved mixing and oxidation within the combustion chamber. For illustration, each protrusion 202 includes a first side face 206, which faces in a direction against the swirl S, and a second side face 208, which faces in a direction with the swirl S. In the nomenclature used herein, a direction in which each side face of the protrusion "faces" means the direction in which a normal vector that is generally perpendicular to the respective side face and point away from the surface in an outward direction with respect to the protrusion is pointing. Two such vectors, V1 and V2, are shown on one of the protrusions 202 on the left side of the figure for illustration.

In various embodiments, the first and second side faces of the protrusions may be different from one piston to another, but they all will share a similar trend, which is that the first side face 206 of each protrusion 202, i.e., on the side that faces against the swirling direction S, will be generally concave such that a larger turning effect is provided to fluids impinging and being redirected by the first side face 206 to counteract the swirl that is present in the swirling direction S; the same trend also includes that the second side face 208 of each protrusion 202, i.e., on the side that faces away from the swirling direction S, will be generally flat or convex such that a lesser turning effect is provided to fluids impinging and being redirected by the second side face 208, because those fluids are already turning in the opposite direction as the swirling direction S.

As can be seen from FIG. 2, when the fuel jet 118 impinges onto the wall 130, it separates into many sub-streams that include two tangential streams that follow the curvature of the wall 130 until they meet the protrusions 202 that flank the area onto which particular fuel jet 118 impinges along the wall 130. These two tangential jets can be referred to as the clockwise (CW) subjet, i.e. the subjet that turns in a location that is located in a clockwise direction relative to the particular fuel jet 118, and the counter-clockwise (CCW) subjet, i.e. the subjet that turns in a location that is located in a counter-clockwise direction relative to the particular fuel jet 118. For a more complete burn in the combustion chamber 100, it is desired to have both the CW and CCW fuel subjets advance in a radial direction towards the center of the combustion chamber. The different shapes of the first and second side faces 206 and 208 can accomplish this taking under consideration the swirl S in the cylinder. Thus, the CW subjet in the embodiment shown makes a shallow turn off the second side face 208, because it will be carried along the swirl S as it advances towards the tip 116. For the same reason, the CCW subjet makes a sharper turn off the first side face 206, because its course will also be adjusted as it advances against the swirl S.

Figure 4:
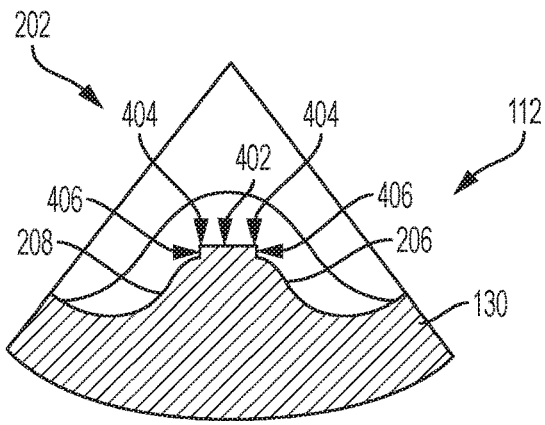
FIG. 4 is a second alternative embodiment for a protrusion in accordance with the disclosure.

An alternative or second exemplary embodiment for the protrusion 202 is shown in FIG. 4, which is a partial fragment of the piston 112 shown in cross section. In this embodiment, the protrusion 202 includes a generally flat inner face 402 that protrudes radially inwardly towards the center of the piston relative to remaining surfaces of the protrusion 202. The width of the flat inner face 402 in a peripheral direction is defined between two sharp edges 404. The sharp edges 404 are disposed along an interface between the flat inner face 402 and a radially inner side of generally radially extending walls 406 disposed on either side of the protrusion 202. The radially extending walls 406 meet the first and second side faces 206 and 208 of the protrusion 202 as they extend in a radially outward direction. It is noted that the first and second side faces 206 and 208 may have different curvatures, or the same curvature. It is also noted that the walls 406 may extend at an angle relative to a corresponding radius of the piston, for example, to provide a relatively trapezoidal shape of the portion of the protrusion defined between the flat inner face 402 and the two walls 406.

Figure 5:
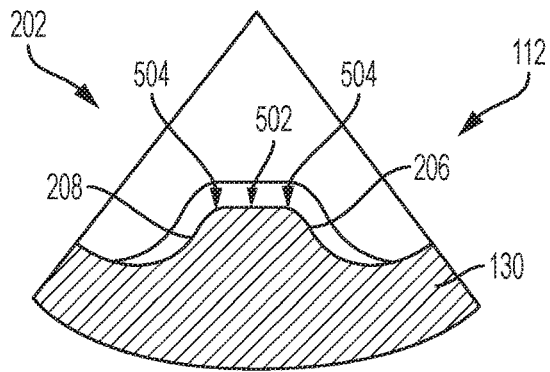
FIG. 5 is a third alternative embodiment for a protrusion in accordance with the disclosure.

A third exemplary embodiment for the protrusion 202 is shown in FIG. 5. In this embodiment, the protrusion 202 includes a generally flat inner face 502 that faces radially inwardly towards the center of the piston relative to remaining surfaces of the protrusion 202. The width of the flat inner face 502 in a peripheral direction is defined between two sharp edges 504. In this, and in the remaining embodiments, the term "sharp" in reference to the edges on either side of a flat face denote surface transitions at which a flow of material impinging onto the flat face will turn and pass over the "sharp" edge while separating therefrom, without following the curve of the surface beyond the edge. Stated differently, the "sharp" edges have a sufficiently sharp radius to avoid flow redirection due to Coanda effects. The sharp edges 504 are disposed along an interface between the flat inner face 502 and the first and second side faces 206 and 208 of the protrusion 202.

Figure 6:
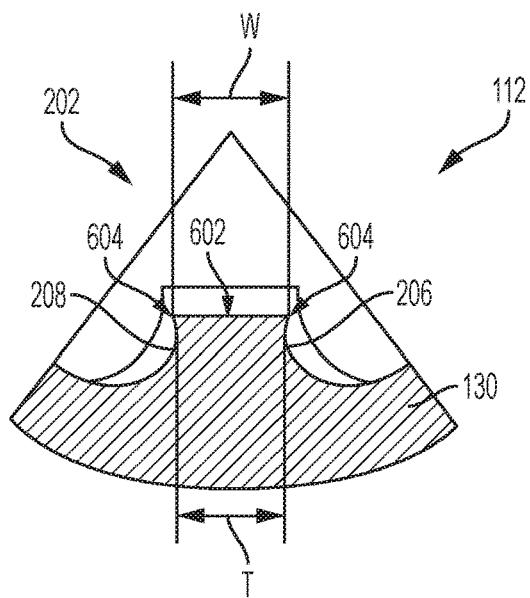
FIG. 6 is a fourth alternative embodiment for a protrusion in accordance with the disclosure.

A fourth exemplary embodiment for the protrusion 202 is shown in FIG. 6. In this embodiment, the protrusion 202 includes a generally flat inner face 602 that faces radially inwardly towards the center of the piston relative to remaining surfaces of the protrusion 202. The width, W, of the flat inner face 502 is larger than a minimum wall thickness, T, of the protrusion in a peripheral direction, as shown in FIG. 6. As in the embodiment of FIG. 5, the width W in the peripheral direction is defined between two sharp edges 604. The sharp edges 604 in this embodiment are disposed along an interface between the flat inner face 602 and the first and second side faces 206 and 208 of the protrusion 202, which first and second side faces 206 and 208 in this embodiment are both concave but at a deeper or shallower radius.

INDUSTRIAL APPLICABILITY

The present disclosure is not only applicable to internal combustion engines having reciprocating pistons, as described relative to the embodiments illustrated herein, but also to other types of applications, such as gas turbines, industrial burners and the like. In general, the various asymmetrical protrusions can be formed in a structure that the fuel jet will impinge upon when injected by an injector into a combustion chamber. The protrusions arcuate indents and the redirection and segregation of fuel jets and plumes they provide are effective in promoting faster combustion and redirection of developing flames towards more oxygen-rich areas at the center of the cylinder.

In addition to the desirable effects provided by redirection of flames and/or the fuel jets that produce the flames, radially and/or tangentially relative to the piston and bore, the mixing effects that provide improved and more complete combustion can be improved by the ledges formed between the protrusions along the inner periphery of the piston cylindrical outer wall. As described above, the ledges may, at least temporarily, redirect the flames axially along the reciprocating direction of travel of the piston, as well as radially outwardly such that air present in the squish region of the combustion cylinder may be utilized to oxidize fuel, soot and other compounds during combustion.

To maintain separation of the fuel jets or flames, at least initially, and to promote more vigorous mixing of the fuel with the oxidizers in the combustion chamber, the protrusions may further include sharp edges along their radially inward portions, i.e., where the tangentially redirected flames turn to advance towards the center of the combustion cylinder. In the embodiments described above, and in other, similar embodiments, the sharp edges are disposed on either side of flat, inwardly facing faces of the protrusions. These sharp edges create edge-effects on the advancing flames to promote and enhance mixing.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. An internal combustion engine, comprising:
an engine block having a cylinder bore;
a cylinder head having a flame deck surface disposed at one end of the cylinder bore;
an air intake valve associated with the cylinder head and configured to open and allow a flow of intake charge into the cylinder bore;
a piston connected to a rotatable crankshaft and configured to reciprocate within the cylinder bore along a longitudinal direction, the piston having a crown portion facing the flame deck surface along the longitudinal direction such that a combustion chamber is defined within the cylinder bore and between a top surface of the crown portion and the flame deck surface, the crown portion including a piston bowl having a generally concave shape and extending within the crown portion and a piston wall, the piston wall extending peripherally around the piston along a circumferential direction, an inner face of the piston wall facing a center of the piston bowl along a radial direction, the radial direction being perpendicular to the longitudinal direction;

a fuel injector having a nozzle tip disposed in fluid communication with the combustion chamber, the nozzle tip having a plurality of nozzle openings configured to inject a plurality of fuel jets into the combustion chamber, each fuel jet of the plurality of fuel jets being provided along a respective fuel jet centerline;

a plurality of protrusions disposed in the piston bowl adjacent to the piston wall, each protrusion of the plurality of protrusions including
an apex,
a first side surface extending from the piston wall to the apex, and
a second side surface extending from the piston wall to the apex, the second side surface facing away from the first side surface along the circumferential direction, the apex being disposed closer to the center of the piston bowl than the piston wall along the radial direction; and at least one ledge defined by a ledge wall and a ledge floor, the ledge floor extending from the inner face of the piston wall and away from the center of the piston bowl along the radial direction, the ledge floor being disposed between the top surface of the piston and a bottom of the piston bowl along the longitudinal direction, the ledge wall extending from the ledge floor toward the top surface of the piston along the longitudinal direction, the ledge wall facing the center of the piston bowl along the radial direction, wherein the apex of each protrusion is defined by a flat inner face, the flat inner face being flat in a reference plane defined exclusively by the radial direction and the circumferential direction, wherein each protrusion has a minimum circumferential thickness along the circumferential direction, a radial location of the minimum circumferential thickness being located between the flat inner face and the piston wall along the radial direction, and wherein a width of the flat inner face along the circumferential direction is greater than the minimum circumferential thickness.

2. The internal combustion engine of claim 1, wherein the at least one ledge is disposed between two adjacent protrusions from the plurality of protrusions and occupies a length along an inner periphery of the piston wall.

3. The internal combustion engine of claim 1, wherein the at least one ledge is formed in segments, each segment spanning a chordal distance along an inner circumference of the piston wall between adjacent protrusions.

4. The internal combustion engine of claim 3, wherein each segment is curved to follow a contour of the piston wall.

5. The internal combustion engine of claim 4, wherein the piston wall has a thickness extending from the inner face of the piston wall to an outer face of the piston wall along the radial direction, each segment has a radial width extending from the inner face of the piston wall to the ledge wall along the radial direction, and the radial width of each segment is less than the thickness of the piston wall.

6. The internal combustion engine of claim 1, wherein flat inner face is disposed between the first side surface and the second side surface along the circumferential direction.

7. The internal combustion engine of claim 1, wherein the flat inner face is defined between two sharp edges.

8. The internal combustion engine of claim 7, wherein the two sharp edges are disposed along interfaces between the flat inner face and the first and second side surfaces of the corresponding protrusion.

9. A piston for an internal combustion engine, the piston comprising:
a piston body;
a crown portion extending below a top surface of the piston body along a longitudinal direction, the crown portion including a piston bowl having a generally concave shape and extending within the crown portion and a piston wall, the piston wall extending peripherally around the piston body along a circumferential direction, an inner face of the piston wall facing a center of the piston bowl along a radial direction, the radial direction being perpendicular to the longitudinal direction;

a plurality of protrusions disposed in the piston bowl adjacent to the piston wall, each protrusion of the plurality of protrusions including
an apex,
a first side surface extending from the piston wall to the apex, and
a second side surface extending from the piston wall to the apex, the second side surface facing away from the first side surface along the circumferential direction, the apex being disposed closer to the center of the piston bowl than the piston wall along the radial direction; and at least one ledge defined by a ledge wall and a ledge floor, the ledge floor extending from the inner face of the piston wall and away from the center of the piston bowl along the radial direction, the ledge floor being disposed between the top surface of the piston and a bottom of the piston bowl along the longitudinal direction, the ledge wall extending from the ledge floor toward the top surface of the piston along the longitudinal direction, the ledge wall facing the center of the piston bowl along the radial direction, wherein the apex of each protrusion is defined by a flat inner face, the flat inner face being flat in a reference plane defined exclusively by the radial direction and the circumferential direction, wherein each protrusion has a minimum circumferential thickness along the circumferential direction, a radial location of the minimum circumferential thickness being located between the flat inner face and the piston wall along the radial direction, and wherein a width of the flat inner face along the circumferential direction is greater than the minimum circumferential thickness.

10. The piston of claim 9, wherein the at least one ledge is disposed between two adjacent protrusions from the plurality of protrusions and occupies a length along an inner periphery of the piston wall.

11. The piston of claim 9, wherein the at least one ledge is formed in segments, each segment spanning a chordal distance along an inner circumference of the piston wall between adjacent protrusions.

12. The piston of claim 11, wherein each segment is curved to follow a contour of the piston wall.

13. The piston of claim 12, wherein the piston wall has a thickness extending from the inner face of the piston wall to an outer face of the piston wall along the radial direction, each segment has a radial width extending from the inner face of the piston wall to the ledge wall along the radial direction, and the radial width of each segment is less than the thickness of the piston wall.

14. The piston of claim 9, wherein the flat inner face is disposed between the first side surface and the second side surface along the circumferential direction.

15. The piston of claim 9, wherein the flat inner face is defined between two sharp edges.

16. The piston of claim 15, wherein the two sharp edges are disposed along interfaces between the flat inner face and the first and second side surfaces of the corresponding protrusion.

* * * * *